United States Patent
Haraguchi (10) Patent No.: US 11,999,221 B2
(45) Date of Patent: Jun. 4, 2024

(54) VEHICLE SUN VISOR

(71) Applicant: KYOWA SANGYO CO., LTD., Toyota (JP)

(72) Inventor: Takashi Haraguchi, Toyota (JP)

(73) Assignee: KYOWA SANGYO CO., LTD., Toyota (JP)

( * ) Notice: Subject to any disclaimer, the term of this patent is extended or adjusted under 35 U.S.C. 154(b) by 178 days.

(21) Appl. No.: 17/642,741

(22) PCT Filed: Oct. 15, 2020

(86) PCT No.: PCT/JP2020/038979
§ 371 (c)(1),
(2) Date: Mar. 14, 2022

(87) PCT Pub. No.: WO2021/106414
PCT Pub. Date: Jun. 3, 2021

(65) Prior Publication Data
US 2022/0324305 A1    Oct. 13, 2022

(30) Foreign Application Priority Data
Nov. 25, 2019    (JP) .................................. 2019-212223

(51) Int. Cl.
*B60J 3/02*    (2006.01)
(52) U.S. Cl.
CPC .................................. *B60J 3/0213* (2013.01)
(58) Field of Classification Search
CPC .................................. B60J 3/02; B60J 3/0213
See application file for complete search history.

(56) References Cited

U.S. PATENT DOCUMENTS 5,365,416 A * 11/1994 Peterson ............... B60Q 3/252
                                                                 362/135

FOREIGN PATENT DOCUMENTS

| DE | 102010047044 A1 | * | 2/2012 | ............ B60J 3/0282 |
| EP | 1698500 A1 | | 9/2006 | |
| JP | 2004-189158 A | | 7/2004 | |
| JP | 2018-177101 A | | 11/2018 | |
| KR | 20040106724 A | * | 12/2004 | |

OTHER PUBLICATIONS

Dec. 15, 2020 International Search Report issued in International Patent Application No. PCT/JP2020/038979.
Dec. 15, 2020 Written Opinion issued in International Patent Application No. PCT/JP2020/038979.

* cited by examiner

Primary Examiner — Joseph D. Pape
(74) Attorney, Agent, or Firm — Oliff PLC (57) ABSTRACT

A vehicle sun visor includes a visor body and a support shaft that attaches the visor body to a ceiling surface of a vehicle cabin. The visor body includes a first component and a second component that are stacked in a thickness direction. The support shaft supports the visor body such that the visor body is rotatable between a service position and a storage position. The support shaft is rotatably supported by a bearing part provided in the first component. The first component is provided with a housing part that houses a mirror. The housing part and the bearing part are connected by a connecting rib that extends in a direction orthogonal to a longitudinal direction of the support shaft. The connecting rib, the bearing part, and the housing part are all provided in the first component.

3 Claims, 6 Drawing Sheets

|  | I [mm] AREA MOMENT OF INERTIA | FIRST CORE | CONVENTIONAL | INVENTION |
|---|---|---|---|---|
| IMPACT STIFFNESS |  | FIRST CORE | 11342 | 10463 |
|  |  | SECOND CORE | 12291 | 1782 |
| WEIGHT REDUCTION | SUN VISOR ASSY MASS [g] |  | 445 | 417 |

VEHICLE SUN VISOR

TECHNICAL FIELD

The present invention relates to a sun visor mounted to a vehicle ceiling. For example, the present invention relates to a sun visor including a plate-shaped visor body and used in a manner such that the visor body rotates between a service position along a windshield of a vehicle and a storage position along a ceiling.

BACKGROUND ART

A sun visor described in Patent Document 1 includes a plate-shaped visor body, and a support shaft inserted into the visor body and supporting the visor body such that the visor body is rotatable. The support shaft is a substantially L-shaped bar and includes a horizontal shaft inserted into the visor body and a vertical shaft extending from an end part of the horizontal shaft such that the vertical shaft is substantially orthogonal to the horizontal shaft. The visor body can be adjusted in angle between a service position along a windshield and a storage position along a ceiling by rotating around the horizontal shaft. A mirror unit is provided in the substantially center of the visor body.

Various requests are made to the sun visor. For example, when a collision occurs during vehicle traveling, the vehicle suddenly stops. The body of an occupant moves forward from a seat due to the law of inertia. In a case where the occupant hits a lower end of the visor body, an impact may be applied to the sun visor. In consideration of this state, the sun visor may be requested to have such a structure that the support shaft breaks before the visor body breaks. In view of this, a visor body with a high strength is desired, but it is also requested to reduce the visor body in weight.

CITATION LIST

Patent Literatures

Patent Document 1: Japanese Unexamined Patent Application Publication No. 2004-189158 (JP 2004-189158 A)

SUMMARY OF THE INVENTION

Problem to be Solved by the Invention

Therefore, a vehicle sun visor including a light-weight visor body with a high strength has been required.

Means for Solving the Problem

According to one feature of this disclosure, a vehicle sun visor includes a visor body and a support shaft configured to attach the visor body to a ceiling surface of a vehicle cabin. The visor body includes a first component and a second component stacked in a thickness direction. The support shaft supports the visor body such that the visor body is rotatable between a service position and a storage position. The support shaft is rotatably supported by a bearing part provided in the first component. A housing part in which a mirror is housed is provided in the first component. The housing part and the bearing part are connected via a connecting rib extending in a direction orthogonal to a longitudinal direction of the support shaft. The connecting rib, the bearing part, and the housing part are all provided in the first component.

Accordingly, the bearing part and the housing part that have a relatively high strength are both provided in the first component, and besides, the bearing part and the housing part are connected via the connecting rib. Therefore, the strength of the first component is increased. Thus, in a case where an impact is applied to the visor body, the impact is applied to the housing part of the first component, for example. The impact is transmitted to the support shaft via the connecting rib and the bearing part. Thus, it is possible to break the support shaft before the visor body breaks. In other words, it is possible to restrain the breakage of the visor body with this structure. Meanwhile, the bearing part and the housing part are not provided in the second component. Therefore, the second component does not require a high strength. As a result, the second component can have a simple structure, so that the whole visor body can be reduced in weight.

According to another feature of this disclosure, the bearing part includes paired retainer walls arranged in the longitudinal direction of the support shaft, and a bottom wall configured to connect the paired retainer walls. The paired retainer walls have insertion holes through which the support shaft is passed. The bottom wall has a substantially same thickness as a thickness of each of the retainer walls and faces the housing part. The connecting rib extends linearly between the bottom wall and the housing part. Accordingly, when an impact is applied to the visor body and the housing part receives the impact, the connecting rib can efficiently transmit the impact to the bearing part.

According to another feature of this disclosure, the bottom wall of the bearing part includes a first end part and a second end part in the longitudinal direction of the support shaft. The housing part includes an upper wall facing the bottom wall of the bearing part. The connecting rib includes a first rib part extending from the first end part of the bottom wall and connected to the upper wall, and a second rib part extending from the second end part of the bottom wall and connected to the upper wall. Accordingly, when an impact is applied to the visor body and the housing part receives the impact, the first rib part and the second rib part transmit the impact to the bearing part. Since the first rib part and the second rib part are located at respective ends of the bearing part, torsion is hard to be generated, so that the impact is efficiently transmitted to the bearing. Further, since the bearing part, the first rib part, the second rib part, and the housing part are formed integrally such that they are continuous with each other from the bearing part to the other end of the visor body that faces the bearing part, the impact received by the visor body is more efficiently transmitted to the support shaft.

According to another feature of this disclosure, the sun visor includes a rib extending over the housing part and the bearing part, and a plurality of coupling pins and a plurality of boss parts such that the first component is coupled with the second component. The coupling pins are formed in either one of the first component and the second component, and the boss parts are formed in the other one. At least one of the coupling pins and the boss parts is located in a part of the rib. Accordingly, the strength of the visor body is increased by the rib and the coupling pin or the boss part located in the part of the rib.

MODES FOR CARRYING OUT THE INVENTION

Figure 1:
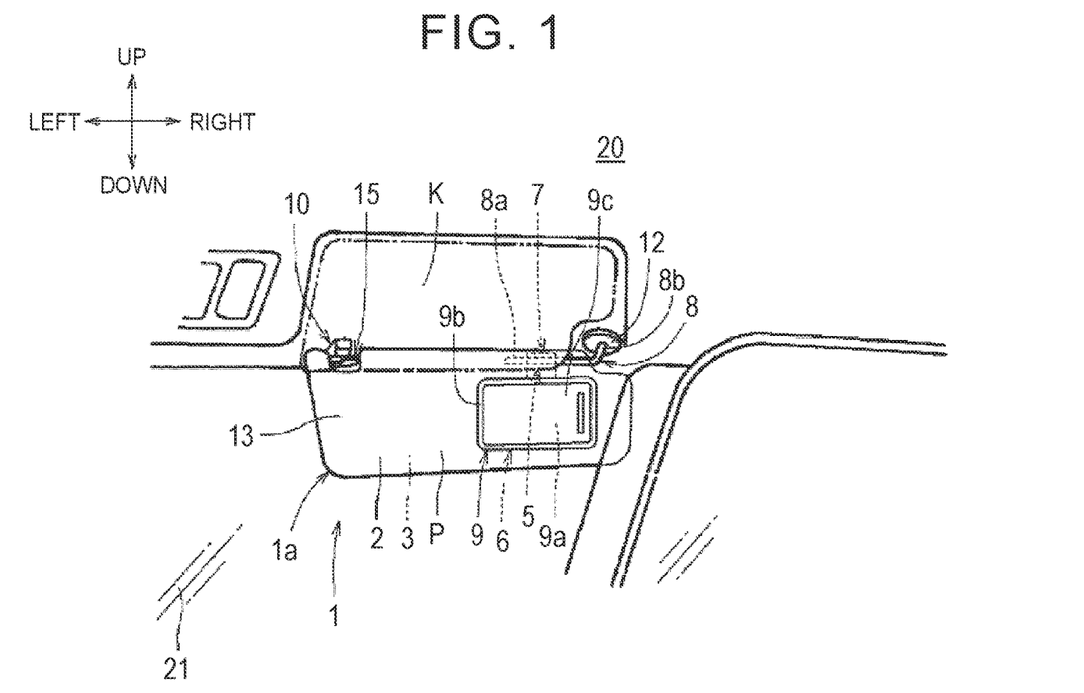
FIG. 1 is a perspective view of a part of an inner part of a vehicle and a sun visor attached to a vehicle ceiling.

One embodiment of the present invention will be described with reference to FIGS. 1 to 7. As illustrated in FIG. 1, a vehicle sun visor 1 is mounted to a ceiling surface 20 near a windshield 21 inside a vehicle cabin. The vehicle sun visor 1 includes a visor body 1a and a mirror unit 9 provided on the front side of the visor body 1a.

As illustrated in FIG. 1, the visor body 1a has a substantially rectangular shape and includes a first component 2 and a second component 3 each of which has a flat plate shape and which are stacked in the thickness direction. The surface of the visor body 1a is covered with a skin 13. The support shaft 8 is a substantially L-shaped bar, and a vertical shaft 8b extends upward from a distal end of a horizontal shaft 8a such that the vertical shaft 8b is substantially orthogonal to the horizontal shaft 8a. A bracket 12 is mounted to a distal end of the vertical shaft 8b, and the bracket 12 is attached to the ceiling surface 20 of the vehicle cabin. The support shaft 8 configured to support the visor body 1a such that the visor body 1a is rotatable is mounted to the visor body 1a via a clip 7 fitted to a bearing part 5.

Figure 2:
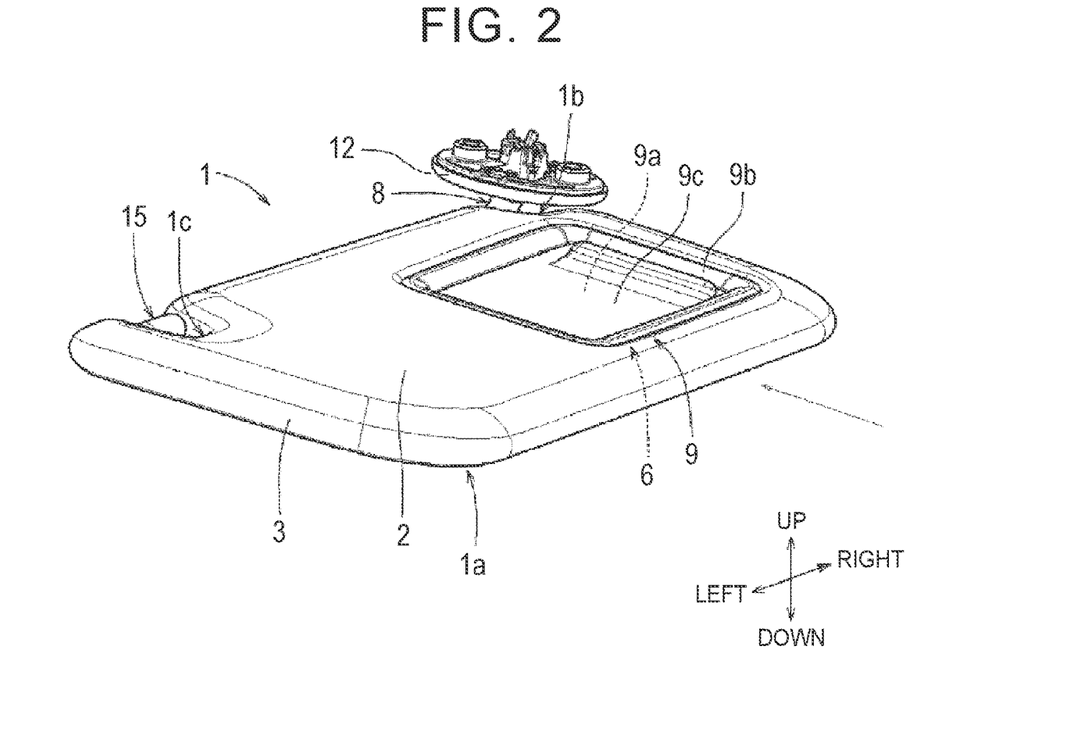
FIG. 2 is a perspective view of the sun visor.

As illustrated in FIGS. 1, 2, a mirror unit 9 includes a mirror frame 9b, a mirror 9a, and a sliding mirror cover 9c. The mirror frame 9b has a rectangular shape along an edge of an opening 2g of the first component 2 of the visor body 1a illustrated in FIG. 4. A bottom wall 5d of the bearing part 5 has a surface that is substantially flush with a front surface 6i of a mirror housing part 6 and is continuous with the front surface 6i. The mirror 9a is attached to the mirror frame 9b and is located in the opening 2g of the first component 2. The mirror cover 9c is slidably attached to the mirror frame 9b. The mirror cover 9c covers the mirror 9a at a service position. The mirror cover 9c slides from the service position to a closing position and moves into the visor body 1a. Thus, the mirror 9a is exposed.

As illustrated in FIGS. 1, 2, a shaft 15 is removably held by a hook 10 fixed to the ceiling surface 20. When the shaft 15 is attached to the hook 10, the visor body 1a rotates around the shaft 15 and the horizontal shaft 8a between a service position P along the windshield 21 and a storage position K along the ceiling surface 20.

Figure 3:
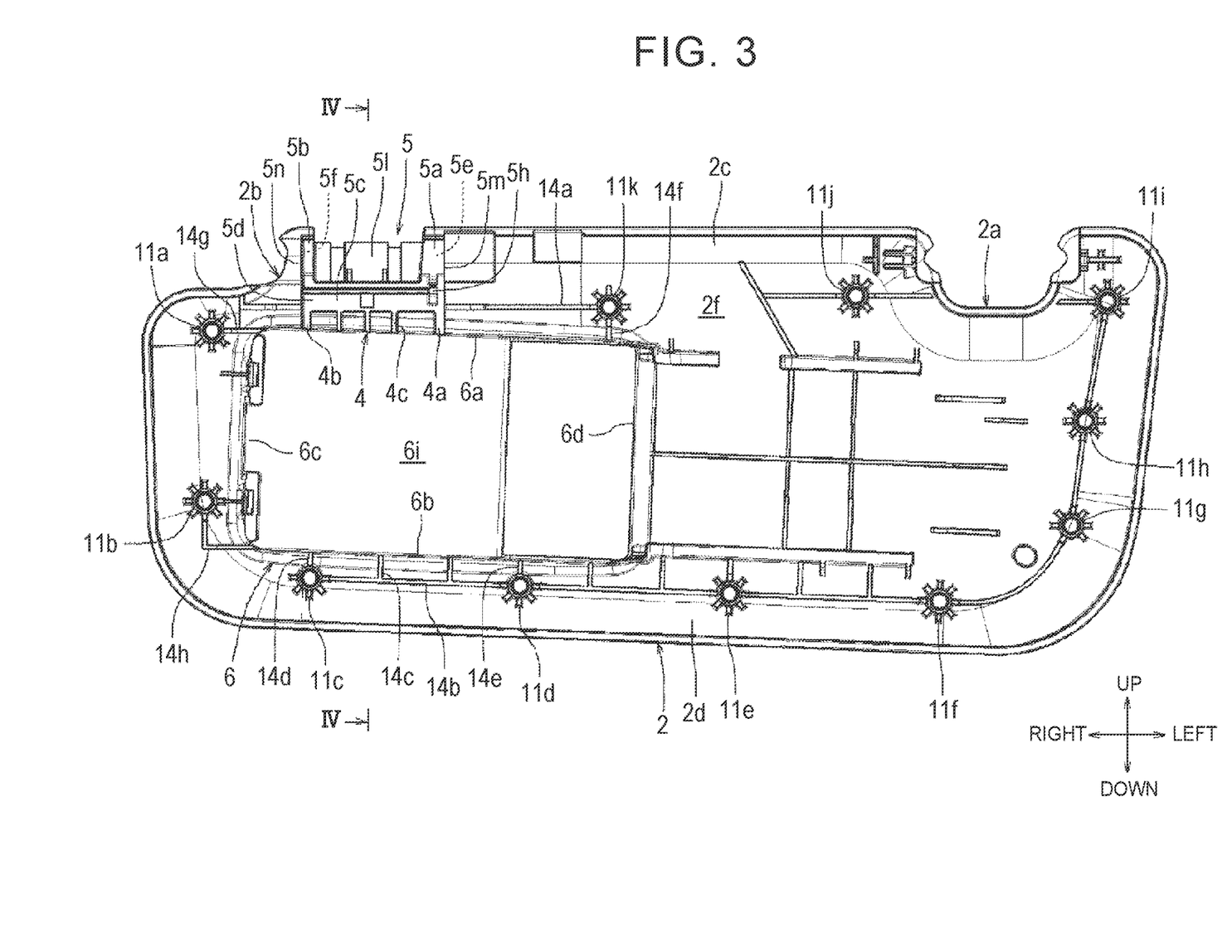
FIG. 3 is a back view of a visor body (a first component on the front side) according to an embodiment.
Figure 6:
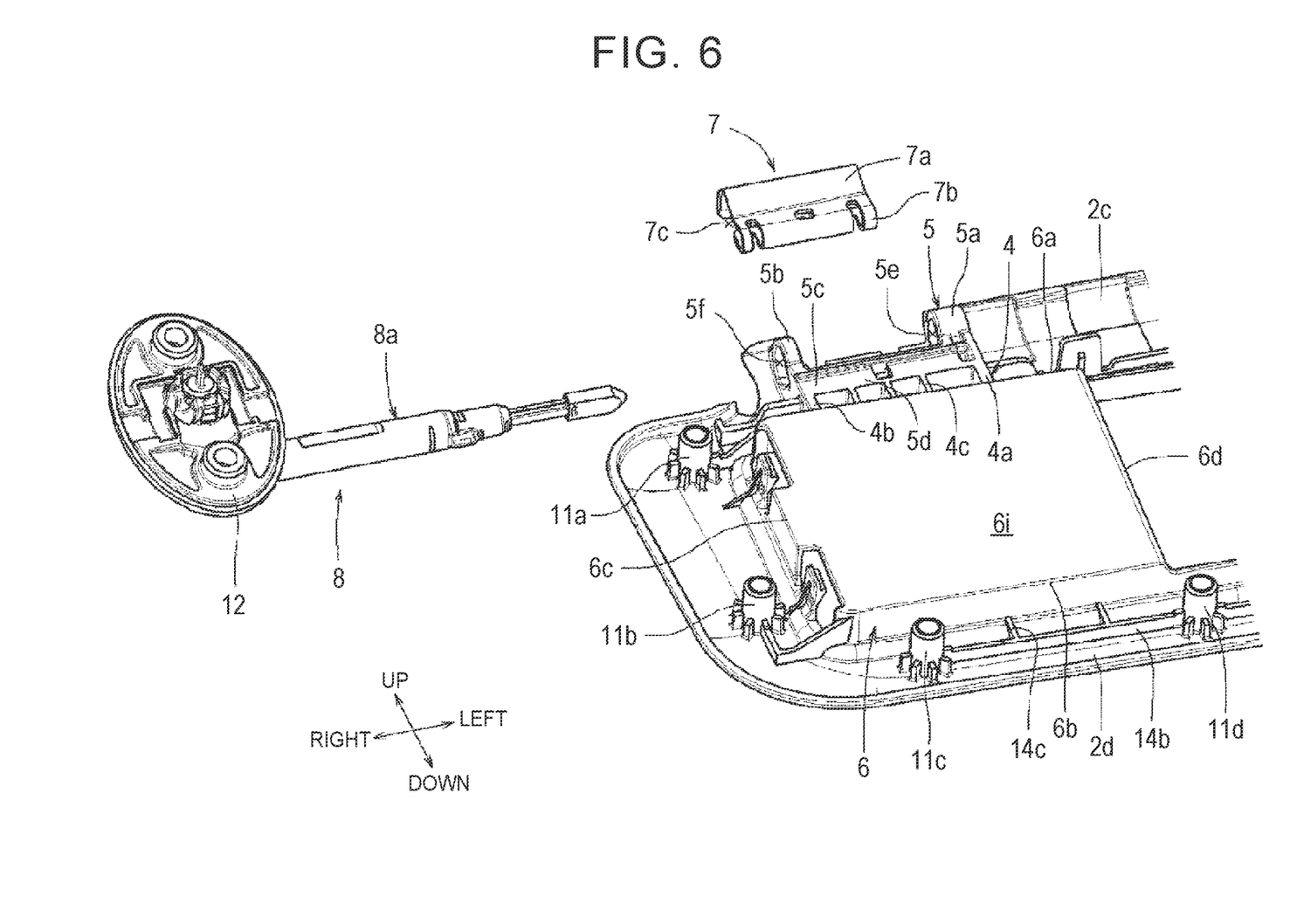
FIG. 6 is an exploded perspective view of the sun visor and illustrates a support shaft, a clip, and the first component.

As illustrated in FIGS. 3, 6, the first component 2 has a substantially rectangular shape. The first component 2 is made of resin, for example. A left recessed part 2a and a right recessed part 2b are provided in an upper side 2c of the first component 2. The bearing part 5 configured to hold the horizontal shaft 8a such that the horizontal shaft 8a is rotatable is provided on the left side of the right recessed part 2b. The mirror housing part 6 in which the mirror unit 9 is housed is provided below the bearing part 5. Coupling pins 11 (11a to 11k) are formed on an inner surface 2f of the first component 2 along an inner contour of the first component 2. Each of the coupling pins 11 has a substantially cylindrical shape. An outer edge 2d is provided between each of the coupling pins 11 and an edge of the first component 2.

As illustrated in FIG. 3, a plurality of ribs 14 extending diagonally, in the up-down direction, and in the right-left direction is provided on the inner surface 2f of the first component 2. The ribs 14 increase the strength of the first component 2. The ribs 14 have a substantially plate shape and include ribs 14a to 14h. The rib 14a extends leftward from an outer surface (a left surface) 5m, in the right-left direction, of a retainer wall 5a of the bearing part 5 to the coupling pin 11k. The rib 14f extends downward from the coupling pin 11k to an upper wall 6a of the mirror housing part 6.

As illustrated in FIG. 3, the rib 14g extends rightward from an upper end of a right wall 6c. The rib 14g extends to the coupling pin 11a rising on the right side of the right wall 6c such that the rib 14g extends from the upper wall 6a. The rib 14h extends in a substantially L-shape from a bottom end of the right wall 6c. The rib 14h extends rightward from the right wall 6c such that the rib 14h extends from a lower wall 6b. The rib 14h extends upward from a right end to the coupling pin 11b rising on the right side of the right wall 6c. The coupling pins 11c, 11d rise, respectively, in a lower left region and a lower right region of the lower wall 6b. The rib 14b extends in the right-left direction so as to connect the coupling pins 11c, 11d. The rib 14b and the lower wall 6b are connected via a plurality of, e.g., two ribs 14c. The ribs 14c extend linearly in the up-down direction.

As illustrated in FIG. 3, the coupling pins 11e, 11f are located side by side on a straight line toward the left direction from the coupling pin 11d. The rib 14d extends in the up-down direction so as to connect the lower wall 6b to the coupling pin 11c. The rib 14e extends in the up-down direction so as to connect the lower wall 6b to the coupling pin 11d.

As illustrated in FIG. 3, the mirror housing part 6 is located in a substantially central region in the up-down direction in the right half of the first component 2. In the mirror housing part 6, the mirror unit 9 is held by being fitted to a back surface 6j of the mirror housing part 6 (see FIG. 4). The mirror housing part 6 includes the upper wall 6a, the lower wall 6b, the right wall 6c, and a left wall 6d that project to the front side from the back surface 6j of the first component 2 and are disposed in a rectangular shape. The upper wall 6a extends in the right-left direction and faces the bottom wall 5d of the bearing part 5. The lower wall 6b is located below the upper wall 6a and extends in parallel to the upper wall 6a. The right wall 6c connects a right end of the upper wall 6a to a right end of the lower wall 6b. The left wall 6d connects a left end of the upper wall 6a to a left end of the lower wall 6b.

As illustrated in FIGS. 3, 6, the bearing part 5 includes a pair of retainer walls 5a, 5b into which the horizontal shaft 8a of the support shaft 8 is inserted. Respective lower parts of the retainer walls 5a, 5b are connected via a base part 5c. The retainer walls 5a, 5b are located at an interval in the longitudinal direction of the first component 2. As illustrated in FIG. 6, substantially circular openings 5e, 5f are formed in the retainer walls 5a, 5b. The base part 5c includes the bottom wall 5d in a bottom end. The retainer wall 5a (or 5b) and the bottom wall 5d have the substantially same thickness. A rear wall part 51 is provided above the base part 5c. The clip 7 is provided in the bearing part 5, and the clip 7 is held by the retainer walls 5a, 5b and the base part 5c.

As illustrated in FIG. 6, the clip 7 includes a surrounding part 7a and a U-shaped spring part 7b as one member so as to elastically catch the horizontal shaft 8a of the support shaft 8. The clip 7 is made of an elastically deformable metal material. An opening 7c is formed inside the surrounding part 7a. After the clip 7 is mounted to the bearing part 5, the horizontal shaft 8a extends through the openings 5e, 5f of the retainer walls 5a, 5b and the opening 7c of the surrounding part 7a. Thus, the horizontal shaft 8a and the clip 7 are mounted to the bearing part 5 of the first component 2.

As illustrated in FIGS. 3, 6, a connecting rib 4 is provided between the bearing part 5 and the mirror housing part 6. The bottom wall 5d of the bearing part 5 and the upper wall 6a of the mirror housing part 6 are connected via the connecting rib 4. The connecting rib 4 includes a first rib part 4a linearly extending from a left end of the bottom wall 5d to the upper wall 6a of the mirror housing part 6, and a second rib part 4b linearly extending from a right end of the bottom wall 5d to the upper wall 6a of the mirror housing part 6. The first rib part 4a and the second rib part 4b are parallel to each other.

As illustrated in FIGS. 3, 6, the connecting rib 4 includes a plurality of, e.g., three auxiliary ribs 4c connecting the bottom wall 5d to the upper wall 6a between the first rib part 4a and the second rib part 4b. Each of the auxiliary ribs 4c extends linearly. For example, each of the auxiliary ribs 4c is parallel to the first rib part 4a and the second rib part 4b. The width of each of the auxiliary ribs 4c in the right-left direction is thinner than the widths of the first rib part 4a and the second rib part 4b in the right-left direction. Each of the auxiliary ribs 4c reinforces the connection between the bearing part 5 and the mirror housing part 6, so that an impact received from the mirror housing part 6 is efficiently transmitted to the bearing part 5. Respective end parts of the first rib part 4a, the second rib part 4b, and the auxiliary ribs 4c on a side facing the second component 3 are substantially flush with the front surface 6i of the mirror housing part 6. Accordingly, the connecting rib 4 can transmit the impact received from the mirror housing part 6 to the bearing part 5 by a short distance.

For example, as illustrated in FIG. 2, in a case where an impact is applied to the visor body 1a from an arrow direction, the impact is transmitted to the mirror housing part 6 of the first component 2. The impact is transmitted from the mirror housing part 6 to the support shaft 8 via the mirror unit 9, the connecting rib 4, and the bearing part 5. Thus, the impact is transmitted to the support shaft 8 before the visor body 1a breaks by the impact, and as a result, the support shaft 8 breaks.

Figure 5:
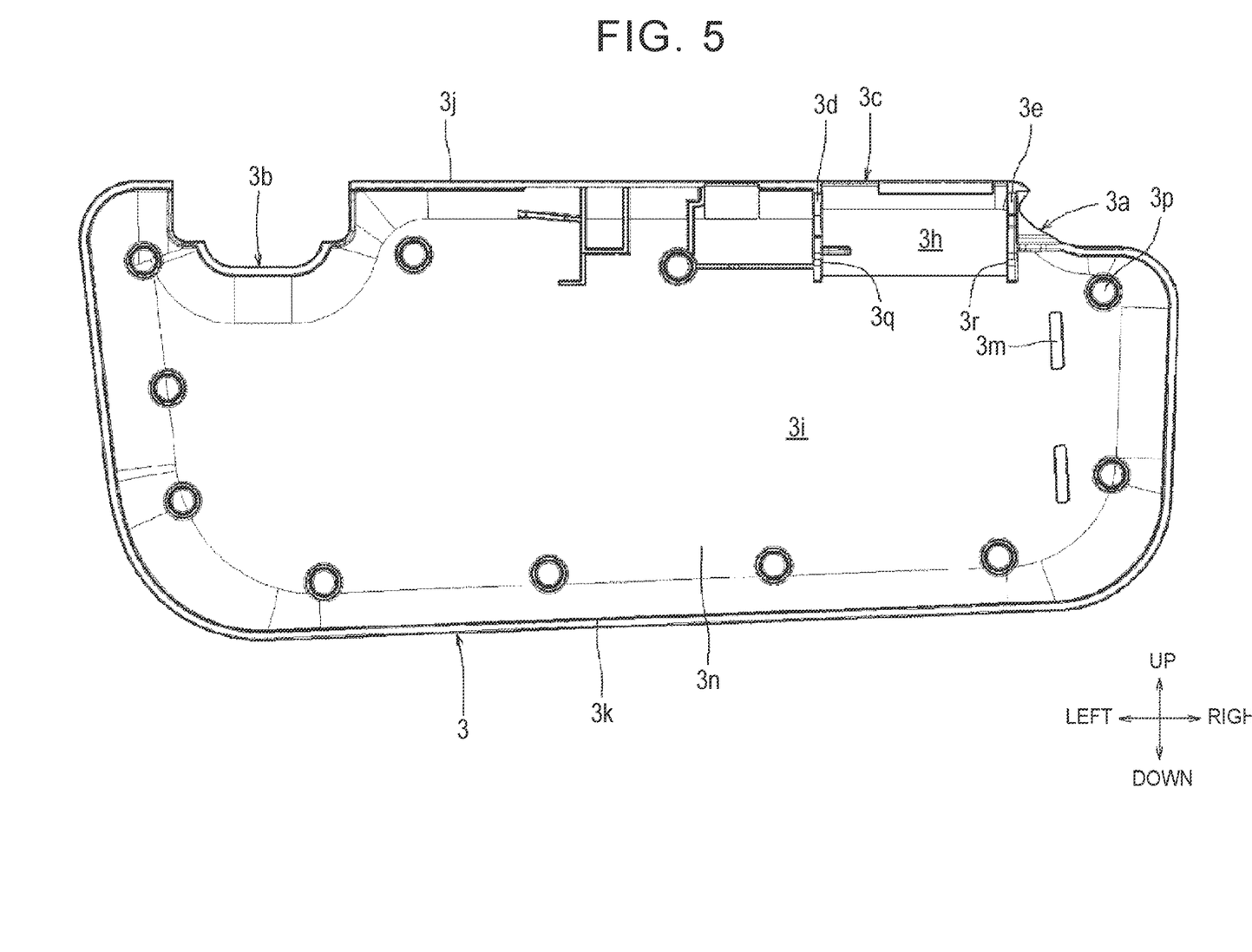
FIG. 5 is a front-surface view of the visor body (a second component on the backside) according to the embodiment.

As illustrated in FIG. 5, the second component 3 has a substantially rectangular shape. The second component 3 is made of resin, for example. A right recessed part 3a and a left recessed part 3b are provided in an upper edge 3j of the second component 3. On the left side of the right recessed part 3a, a bearing housing part 3c in which the bearing part 5 of the first component 2 is housed is formed. When the second component 3 is stacked on the first component 2, the left recessed part 2a of the first component 2 faces the left recessed part 3b of the second component 3. Further, the right recessed part 2b of the first component 2 faces the right recessed part 3a of the second component 3.

The bearing housing part 3c illustrated in FIG. 5 includes paired vertical walls 3d, 3e provided such that the vertical walls 3d, 3e are located at an interval in the right-left direction. When the second component 3 is stacked on the first component 2, the bearing part 5 is provided between the vertical walls 3d, 3e. Thus, outer surfaces 5m, 5n, in the right-left direction, of the retainer walls 5a, 5b of the bearing part 5 illustrated in FIG. 3 face inner surfaces 3q, 3r, in the right-left direction, of the vertical walls 3d, 3e of the bearing housing part 3c.

As illustrated in FIG. 5, an upper edge 3j and a lower edge 3k of the second component 3 have a curved shape. A region 3i between the upper edge 3j and the lower edge 3k is a substantially flat surface. On an inner surface 3n of the second component 3, a plurality of boss parts 3p located along the inner periphery of the second component 3 is provided. The boss parts 3p are located to correspond to the positions of the coupling pins 11 of the first component 2. The boss parts 3p project substantially vertically from the inner surface 3n of the second component 3. When the second component 3 is stacked on the first component 2, the coupling pins 11 provided on the inner surface 2f of the first component 2 illustrated in FIG. 3 are inserted into the boss parts 3p.

Figure 7:
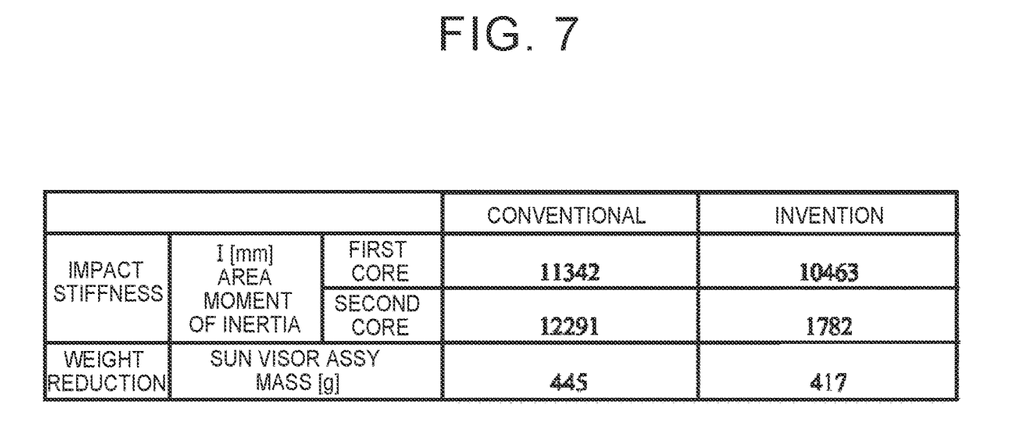
FIG. 7 is a table in which a visor body of the sun visor according to this disclosure is compared with a visor body of a sun visor of a conventional product in terms of stiffness and weight.

Area moments of inertia of the first component 2 and the second component 3 were calculated, weighs thereof were measured, and they were summarized in the table of FIG. 7. Area moments of inertia of a first component 2 and a second component 3 of a conventional-type visor body as a target for comparison were calculated, weighs thereof were measured, and similarly, they were summarized in the table of FIG. 7. The conventional-type visor body is constituted by the first component 2 provided with a mirror housing part and the second component 3 provided with a bearing part. The first component 2 and the second component 3 in the conventional type both have a high strength. That is, the first component 2 and the second component 3 in the conventional type have a strength to such an extent that a support shaft breaks before the visor body breaks when the visor body receives an impact.

From this table, it is found that the area moment of inertia of the first component 2 is substantially the same as that of the first component 2 of the conventional product. That is, the strength of the first component 2 is sufficiently high to such an extent that a force is transmitted to the bearing part 5 and the support shaft 8 can break at the time of receiving an impact. This is because the first component 2 of the present embodiment includes the bearing part 5 and the mirror housing part 6. This is also because the bearing part 5 and the mirror housing part 6 are connected via the connecting rib 4. This is also presumably because the first component 2 has a combination of these parts.

In the meantime, the area moment of inertia of the second component 3 is about one-seventh of that of the second component of the conventional product. Besides, it is found that the weight of the visor body 1a is reduced by about 6.3% in comparison with the conventional product. This is presumably because structural bodies with high stiffness are collected in the visor body 1a of the present embodiment.

As illustrated in FIGS. 1 to 8 as described above, the vehicle sun visor 1 includes the visor body 1a and the support shaft 8 configured to attach the visor body 1a to the ceiling surface 20 of the vehicle cabin. The visor body 1a includes the first component 2 and the second component 3 stacked in the thickness direction. The support shaft 8 supports the visor body 1a such that the visor body 1a is rotatable between the service position P and the storage position K. The support shaft 8 is rotatably supported by the bearing part 5 provided in the first component 2. The first component 2 is provided with the housing part 6 in which the mirror 9a is housed. The housing part 6 and the bearing part 5 are connected via the connecting rib 4 extending in a direction orthogonal to the longitudinal direction of the support shaft 8. The connecting rib 4, the bearing part 5, and the housing part 6 are all provided in the first component 2.

Accordingly, the bearing part 5 and the housing part 6 that have a relatively high strength are both provided in the first component 2, and besides, the bearing part 5 and the housing part 6 are connected via the connecting rib 4. Therefore, the strength of the first component 2 is increased. Thus, in a case where an impact is applied to the visor body 1a, the impact is applied to the housing part 6 of the first component 2, for example. The impact is transmitted to the support shaft 8 via the connecting rib 4 and the bearing part 5. Thus, it is possible to break the support shaft 8 before the visor body 1a breaks. In other words, it is possible to restrain the breakage of the visor body 1a with this structure. Meanwhile, the bearing part 5 and the housing part 6 are not provided in the second component 3. Therefore, the second component 3 does not require a high strength. As a result, the second component 3 can have a simple structure, so that the whole visor body can be reduced in weight as illustrated in FIG. 7.

As illustrated in FIGS. 3 to 6, the bearing part 5 includes the paired retainer walls 5a, 5b arranged in the longitudinal direction of the support shaft 8, and the bottom wall 5d connecting the paired retainer walls 5a, 5b. The insertion holes (openings) 5e, 5f through which the support shaft 8 is passed are formed in the paired retainer walls 5a, 5b. The bottom wall 5d has the substantially same thickness as the thickness of each of the retainer walls 5a, 5b and faces the housing part 6. The connecting rib 4 extends linearly between the bottom wall 5d and the housing part 6. Accordingly, when an impact is applied to the visor body 1a and the housing part 6 receives the impact, the connecting rib 4 can efficiently transmit the impact to the bearing part 5.

As illustrated in FIGS. 3 to 6, the bottom wall 5d of the bearing part 5 includes a first end part and a second end part in the longitudinal direction of the support shaft 8. The housing part 6 includes the upper wall 6a facing the bottom wall 5d of the bearing part 5. The connecting rib 4 includes the first rib part 4a extending from the first end part of the bottom wall 5d so as to be connected to the upper wall 6a, and the second rib part 4b extending from the second end part of the bottom wall 5d so as to be connected to the upper wall 6a. Accordingly, when an impact is applied to the visor body 1a and the housing part 6 receives the impact, the first rib part 4a and the second rib part 4b transmit the impact to the bearing part 5. Since the first rib part 4a and the second rib part 4b are located at respective ends of the bearing part 5, torsion is hard to be generated, so that the impact is efficiently transmitted to the bearing part 5. Further, since the bearing part 5, the first rib part 4a, the second rib part 4b, and the housing part 6 are formed integrally such that they are continuous with each other from the bearing part 5 to the other end of the visor body 1a that faces the bearing part 5, the impact received by the visor body 1a is more efficiently transmitted to the support shaft 8.

As illustrated in FIGS. 3 to 6, the sun visor 1 includes the rib 14 extending over the housing part 6 and the bearing part 5, and the coupling pins 11 and the boss parts 3p by which the first component 2 is coupled with the second component 3. The coupling pins 11 are formed in either one of the first component 2 and the second component 3, and the boss parts 3p are formed in the other one. At least one of the coupling pins 11 and the boss parts 3p is located in a part of the rib 14. Accordingly, the strength of the visor body 1a is increased by the rib 14 and the coupling pin 11 or the boss part 3p located in the part of the rib 14.

This disclosure is not limited to the appearance and the configuration described in the above embodiment, and various changes, addition, or deletion can be made within a range where the scope of the disclosure is not changed.

For example, as illustrated in FIG. 3, the first rib part 4a and the second rib part 4b of the connecting rib 4 extend in the direction orthogonal to the longitudinal direction of the support shaft 8 such that the housing part 6 is connected to the bearing part 5. Instead of this, the first rib part 4a and the second rib part 4b may extend in diagonal directions such that the first rib part 4a and the second rib part 4b intersect with each other.

As illustrated in FIG. 3, the connecting rib 4, the bearing part 5, and the housing part 6 are all provided in the first component 2. Instead of this, at least one of the connecting rib 4, the bearing part 5, and the housing part 6 may be provided in the second component 3 or may be provided separately.

Figure 4:
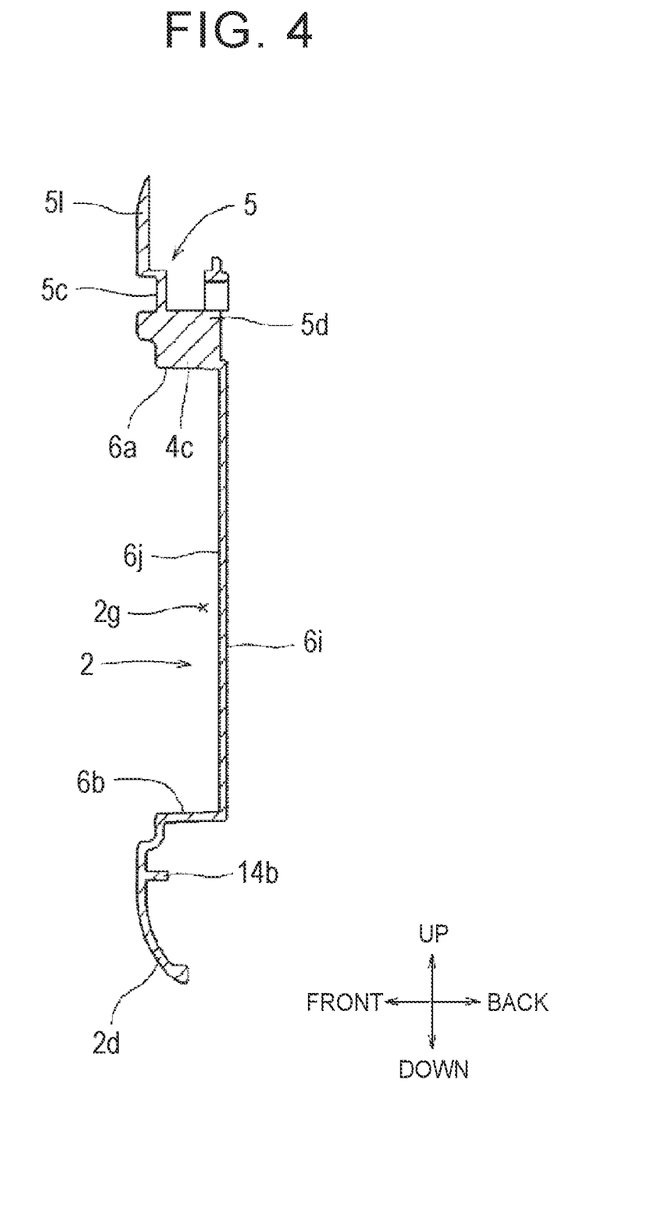
FIG. 4 is a sectional view taken along a line IV-IV defined by arrows in FIG. 3.

As illustrated in FIGS. 3, 4, the retainer walls 5a, 5b and the bottom wall 5d of the bearing part 5 have the substantially same thickness. Instead of this, the retainer walls 5a, 5b and the bottom wall 5d may have different thicknesses. For example, the thickness of each of the retainer walls 5a, 5b may be thinner than the thickness of the bottom wall 5d or vice versa.

As illustrated in FIG. 3, the connecting rib 4 includes the first rib part 4a and the second rib part 4b. Instead of this, the connecting rib 4 may include one or three or more rib parts. For example, the connecting rib 4 may include the auxiliary ribs 4c in addition to the first rib part 4a and the second rib part 4b.

As illustrated in FIG. 3, the coupling pins 11 are formed in the first component 2. Instead of this, the boss parts 3p may be formed in the first component 2, and the coupling pins 11 may be formed in the second component 3. Further, the coupling of the first component 2 with the second component 3 may be achieved by means other than the coupling of the coupling pins 11 with the boss parts 3p, e.g., means achieved by engagement between an engageable piece with an engaged portion using a claw shape.

DESCRIPTION OF THE REFERENCE NUMERALS

1/ vehicle sun visor
1a/ visor body
2/ first component
3/ second component
3p/ boss part
4/ connecting rib
4a/ first rib part
4b/ second rib part
5/ bearing part
5a, 5b/ retainer wall
5d/ bottom wall
5e, 5f/ insertion hole (opening)
6/ housing part (mirror housing part)
6a/ upper wall
8/ support shaft
9a/ mirror
11/ coupling pin
14/ rib

The invention claimed is:
1. A vehicle sun visor comprising:
a visor body including a first component and a second component stacked in a thickness direction of the visor body; and a support shaft configured to attach the visor body to a ceiling surface of a vehicle cabin and support the visor body such that the visor body is rotatable between a service position and a storage position, wherein the first component is a substantially rectangular member made of resin that includes, as a one-piece structure:
   a bearing part configured to support the support shaft such that the support shaft is rotatable relative to the visor body;
   a housing part configured to house a mirror; and
   a connecting rib extending in a direction orthogonal to a longitudinal direction of the support shaft and connecting the housing part and the bearing part to each other, the connecting rib, the bearing part, and the housing part are formed integrally so as to be continuous with each other.

2. The vehicle sun visor according to claim 1, wherein:
the bearing part includes paired retainer walls that have insertion holes through which the support shaft is passed, and that are spaced from each other in the longitudinal direction of the support shaft, and a bottom wall that interconnects the paired retainer walls, the bottom wall having a substantially same thickness as a thickness of each of the retainer walls and facing the housing part;
the connecting rib extends linearly between the bottom wall and the housing part;
the bottom wall of the bearing part includes a first end part and a second end part spaced from each other in the longitudinal direction of the support shaft;
the housing part includes an upper wall facing the bottom wall of the bearing part; and
the connecting rib includes a first rib part extending from the first end part of the bottom wall and connected to the upper wall, and a second rib part extending from the second end part of the bottom wall and connected to the upper wall.

3. The vehicle sun visor according to claim 1, further comprising:
a rib, the rib being located such that, when the vehicle sun visor is disposed in the service position along a vehicle windshield, the rib is vertically below the housing part, which is located vertically below the bearing part;
a plurality of coupling pins formed in one of the first component and the second component so as to couple the first component with the second component; and
a plurality of boss parts formed in an other one of the first component and the second component in which the coupling pins are not formed, wherein at least one of the coupling pins and the boss parts is located in a part of the rib that is located vertically below the housing part and the bearing part.

* * * * *